(12) United States Patent
Ioka et al.

(10) Patent No.: US 6,388,349 B1
(45) Date of Patent: May 14, 2002

(54) MOUNTING STRUCTURE FOR VIBRATOR WITH CONTACT POWER SUPPLY

(75) Inventors: Seiji Ioka; Toshiya Inubushi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/319,698

(22) PCT Filed: Oct. 31, 1997

(86) PCT No.: PCT/JP97/03995

§ 371 Date: Jun. 10, 1999

§ 102(e) Date: Jun. 10, 1999

(87) PCT Pub. No.: WO99/23801

PCT Pub. Date: May 14, 1999

(51) Int. Cl.[7] .................. H02K 7/075; H02K 7/065; H02K 5/00
(52) U.S. Cl. ................... 310/81; 310/71; 439/592
(58) Field of Search ................ 310/81, 71; 340/407.1; 439/592, 593, 839, 861

(56) References Cited

U.S. PATENT DOCUMENTS

| | | | | |
|---|---|---|---|---|
| 4,548,451 A | * | 10/1985 | Benarr et al. ............ 339/17 M |
| 5,943,214 A | * | 8/1999 | Sato et al. ................ 361/752 |
| 5,986,367 A | * | 11/1999 | Tsuzaki et al. ............ 310/71 |

FOREIGN PATENT DOCUMENTS

| JP | 59-66356 | * | 5/1984 | ............ 310/81 |
|---|---|---|---|---|
| JP | 60-174084 U | * | 11/1985 | ............ 310/81 |
| JP | 6223248 | | 6/1987 | |
| JP | 4-2464 U | * | 1/1992 | ............ 310/81 |
| JP | 4-229974 | * | 8/1992 | ............ 310/81 |
| JP | 5-3638 | * | 1/1993 | ............ 310/81 |
| JP | 6-283076 | * | 10/1994 | ............ 310/81 |
| JP | 07-44599 | * | 11/1995 | ............ 310/81 |
| JP | 8-51286 | * | 2/1996 | ............ 310/81 |
| JP | 8-140298 | * | 5/1996 | ............ 310/81 |
| JP | 08155391 | * | 6/1996 | ............ 310/81 |
| JP | 8186626 | | 7/1996 | |
| JP | 2000-78790 | * | 3/2000 | ............ 310/81 |
| JP | 2000-228844 | * | 8/2000 | ............ 310/81 |

* cited by examiner

*Primary Examiner*—Karl Tamai
(74) *Attorney, Agent, or Firm*—Rothwell, Figg, Ernst & Manbeck

(57) ABSTRACT

A mounting member 72 is formed which is pushed by a base plate 3 on the side from which a rotation shaft of the motor main body projects, that is to say, on the side on which the counter weight is mounted. A mounting member 81 is provided which is pushed by the base plate on the bracket 80 mounted on the other face opposite to that from which the rotation shaft of the motor main body projects. A supply terminal 90 having a spring characteristic and which is mounted on the bracket and a terminal 31 which supplies electricity are pressed together. A peaked section 71 is formed in the flexible holder mounted on the outer periphery of the motor main body so that the supply terminal is tightly held against the supply terminal.

14 Claims, 3 Drawing Sheets

MOUNTING STRUCTURE FOR VIBRATOR WITH CONTACT POWER SUPPLY

FIELD OF THE INVENTION

The present invention relates to a vibrator mounting structure for mounting a vibrator which vibrates a mobile wireless device and reports the reception of a signal when a signal is received by a mobile wireless device such as a mobile wireless telephone, a cordless telephone, a PHS, wireless communication devices and other kinds of mobile information processing terminals.

BACKGROUND TO THE INVENTION

When for example the ring tone of a mobile wireless device which has received a signal will disturb the surrounding people in a movie theatre, concert hall, a conference or the like, or when it is desired to confirm the reception of a signal without other people realizing it, a vibrator function which reports the reception of a signal by vibrating the vibrator is provided in a mobile wireless device.

The vibrations of the vibrator when a signal is received are generated by a motor which rotates an eccentrically balanced counter weight. Thus in order to rotate the motor, it is necessary to supply the motor with electrical force. A system of supplying the motor with electrical force generally from a power source through a lead line is used for this purpose.

However the method of using a lead line to supply the motor entails the problems of soldering the lead line after mounting the vibrator in the mobile wireless device. Hence the operation of mounting the vibrator (the operation of assembling the mobile wireless device) becomes complicated.

A supply method which does not entail the complication of soldering involves connecting the supply land to the motor terminal.

By this type of connecting supply method, it is possible to mount the vibrator easily in the mobile wireless device without the necessity to solder the lead line.

FIG. 1 is a cross section of a conventional vibrator mounting using the connecting supply method. In the figure, 2 is a mobile wireless device case formed from a resinous material. 2A is a space storing the vibrator 4 provided in the case 2. 2A1 is a wall face on the counter weight side of the space 2A. 2A2 is a space wall face which acts as a first case wall face abutting with the bracket of the space 2A. 2A3 is a bottom face of the space 2A. The holder gripping faces 2A4, 2A5 of the space 2A which act as second and third case wall faces opposing each face on both sides of the motor main body are not shown in the figure. (Refer to FIG. 5) A rib 2A*a* is provided in the space 2A (bottom face 2A3, holder gripping faces 2A4, 2A5) for the purpose of limiting the mounting position of the vibrator 4. The bottom face 2A3 of the space 2A is formed in a U shape to conform with the outer cylindrical face of the motor main body 5. 3 is a base plate sandwiched between the case 1 (not shown in FIG. 1) and the case 2 (refer to FIG. 2) A supply land 31 used to supply electrical force to the vibrator 4 is provided in the base plate face 3A of the base plate 3.

4 is a vibrator which vibrates the mobile wireless device. 5 is a cylindrical motor main body which rotates when a signal is received. The rotation of the motor main body 5 is transmitted to the rotation shaft 5*a*. 6 is a counter weight which is mounted eccentrically with respect to the rotation shaft 5*a* of the motor main body 5. The counter weight 6 rotates together with the rotations of the rotation shaft 5*a*. 7 is a flexible holder which comprises a flexible body and which is mounted on and closely adheres to the side face of the motor main body 5 so as to cover the motor main body 5. 8 is a bracket which is provided on the terminal face of the opposite side to that on which the counter weight of the motor main body 5 is mounted.

9 is a supply terminal which is mounted on the bracket 8 for supplying electrical force to the motor main body 5. The supply terminal 9 has a spring characteristic which impels elastic force (righting moment) in the radial direction of the motor main body 5. The supply terminal 9 is bent somewhat in the shape of an inverted "V" as shown in the figures and the bent section 9*a* which forms the apex of the inverted "V" shape of the supply terminal 9 is pressing against the supply land 31. The supply terminal 9 is provided with a pair of plate shaped elements although this can not be determined from FIG. 1. (Refer to FIG. 5) The bent section 9*a* of the supply terminal 9 and the supply land 31 are placed in contact by line contact.

In order to improve the reliability of the contact point of the supply land 31 and the bent section 9*a* (so that transmission of electrical power ensured), the surface of the supply terminal 9 and the supply land 31 is normally metal plated.

Hence the vibrator 4 is comprised of a motor main body 5, a counter weight 6, a bracket 8, and a supply terminal 9.

Next the mounting operation and signal receiving operation of the vibrator will be explained.

First the vibrator 4 is arranged into the space 2A of the case 2. The vibrator 4 (motor main body 5) is set in position with its terminal face on the side on which the counter weight is mounted on the rib 2A2 of the space 2A by the terminal face of the bracket 8 on the space wall face 2A2 of the case 2. Hence the mounting position of the axial direction of the motor main body 5 is determined. The vibrator 4 is fixed in the space 2A since the bottom face 2A3 of the space 2A is formed in a U shape to conform with the outer surface of the cylindrical motor main body 5 and the holder 7 presses against the space wall faces 2A4, 2A5. (Refer to FIG. 5)

The base plate 3 is inserted tightly between the case 1 (not shown in FIG. 1) and the case 2. In this way, when the base plate 3 is sandwiched between the case 1, 2, the base plate presses down on the supply terminal 9, and the contact part 9*a* of the supply terminal 9 is pushed against the supply land 31 of the base plate 3.

In this state, when a signal is received by the mobile wireless device, electrical force is supplied to the motor main body 5 through the supply terminal 9 and the supply land 31. The rotation shaft 5*a* of the motor main body 5 rotates at a certain angular speed. When the rotation shaft 5*a* of the motor main body rotates, the counter weight 6 which is mounted eccentrically with respect to the rotating shaft 5*a* rotates. A centrifugal force is generated by the rotations of the counter weight 6. The centrifugal force vibrates the vibrator 4 and those vibrations are transmitted through the case 1,2 to report the signal reception.

In this way, in the vibrator mounting device shown in FIG. 1, mounting is easily performed by supplying electricity through the connection of the supply land 31 and the supply terminal 9 which has a spring characteristic and by arranging the vibrator 4 in the space 2A.

Prior art relevant to the present application are Japanese Utility Model Publication Sho 62-23248 and Japanese Patent Laid-Open Application Hei 8-186626.

Since the conventional mounting for a vibrator is constructed in such a way, the mounting operation of a vibrator 4 of a contact supply type (assembly operation of the mobile wireless device) is easily performed. However when a signal is received and the vibrator moves relative to the case 2 due to the vibrations of the vibrator 4, the contact point is liable to deteriorate due to the supply land 31 and the supply terminal sliding with respect to one another which results in the metal plate wearing off. (Generally the rear face of the supply terminal 9 is metal plated with a layer of nickel plate underneath. When the metal plate wears off, the nickel is exposed to the air and is easily oxidized. Oxidized nickel is a poor conductor and thus electrical conductivity at the contact point deteriorates.) The spring strength of the supply terminal 9 is weakened due to stress relaxation (becomes lax). Thus the problem arises that it is difficult to obtain a reliable contact point between the supply land 31 and the bent section 9a. (Actually conduction of electricity ceases).

Since such problems have occurred, in spite of the fact that the contact supply type has the advantage that mounting time is reduced, it is almost never used in practice.

The present invention is proposed to solve the above problems and has the object of providing a vibrator mounting device which improves the productivity of mobile wireless devices by using a contact supply system which can easily mount a vibrator and which improves the reliability of the contact point of the supply land and the supply terminal by reducing the relative vibrations of the case and the vibrator.

DISCLOSURE OF THE INVENTION

The vibrator mounting of the present invention is provided with a mounting member between the base plate and the other end of the motor main body which extends the rotation shaft. The mounting member pressures the other end of the motor main body towards the bottom face of the case. Thus the counter weight side of the vibrator is compressively supported by the case through the mounting member. Thus the advantage is achieved that relative movements with respect to the case of the vibrator due to the vibrations of the vibrator generated by the rotations of the counter weight are prevented.

The vibrator mounting of the present invention is provided is with a mounting member between the base plate and the other end of the motor main body which extends the rotation shaft. The mounting member pressures the other end of the motor main body in the direction of the bottom face of the case. A mounting member is provided between the base plate and the bracket mounted on the motor main body terminal face opposite to the side from which the rotation shaft of the motor projects. The mounting member pressures the bracket mounting end of the motor main body in the direction of the bottom face of the case. The provision of these members provides the advantage that both ends of the bracket in the direction of the rotation shaft of the motor main body are compressively supported by the case and to that degree, mutual vibrations with respect to the case of the vibrator are prevented.

Furthermore the vibrator mounting of the present invention allows the suppression of mutual vibrations, especially horizontal vibrations, with respect to the case of the vibrator by the provision of a securing means which tightly holds both sides of the vibrator facing the space wall faces comprised of the second and third case wall faces opposite both faces of the flexible holder of the vibrator. However since the vibrator is retained by the securing means, it does not fall out even if the aperture side of the case faces downwards when the base plate is not mounted. Thus mountability and productivity are improved.

The vibrator mounting according to the present invention enables the suppression of relative vibrations with respect to the case of the vibrator by the provision of a rib as a securing means which pressures the flexible holder.

The vibrator mounting according to the present invention suppresses the deterioration of the contact as a result of the supply terminal and the supply land sliding against each other by the formation of a peaked section in the flexible holder facing the supply terminal. The peaked section retains the supply terminal tightly against the base plate.

The vibrator mounting according to the present invention enables the more precise retaining of the supply terminal by making the peak of the peaked section higher than the mounting position of the base plate. The present invention prevents the relative sliding of the supply terminal and the supply land and suppresses the deterioration of the contact.

The vibrator mounting according to the present invention enables improved contact with the supply land at any point of contact with the supply terminal by making the contact point which pushes against the supply land of the supply terminal in a spherical shape.

The vibrator mounting according to the present invention enables the accurate fixation of the vibrator by flexible silicon rubber due to the fact that silicon rubber is the material that forms the In flexible holder.

Furthermore the vibrator mounting according to the present invention is provided with a mounting member which is disposed between the base plate and the other end of the motor main body which expands the rotation shaft. The mounting member pushes the other end of the motor main body towards the direction of the lower face of the case. The counter weight mounting side of the vibrator is compressively supported towards the direction of the lower face of the case through the mounting member by the fact that a peaked section is formed on the flexible holder facing the supply terminal. The peaked section tightly holds the supply terminal against the base plate. As a result, it is possible to prevent the relative movements with respect to the case of the vibrator, to prevent the supply terminal and the supply land from sliding and to suppress the deterioration of the contact.

The vibrator mounting according to the present invention is provided with a mounting member which is disposed between the base plate and the other end of the motor main body which expands the rotation shaft. The mounting member pushes the other end of the motor main body towards the direction of the lower face of the case. A mounting member is provided between the base plate and the bracket mounted on the other motor main body end face opposite the side from which the rotation shaft projects from the motor. The mounting member pushes the bracket mounting end of the motor main body in the direction of the lower face of the case. Both ends of the vibrator are compressively fixed to the case through the mounting member due to the fact that the peaked section is formed on the flexible holder facing the supply terminal and the peaked section tightly holds the supply terminal tightly between the base plate. As a result, it is possible to prevent relative vibrations with respect to the case of the vibrator to a greater degree, to prevent the supply land and the supply terminal from sliding and to suppress the deterioration of the contact.

PREFERRED EMBODIMENTS OF THE INVENTION

In order to explain the invention in greater detail, the preferred embodiments of the invention are explained below with reference to the accompanying figures.

Embodiment 1

Figure 2:
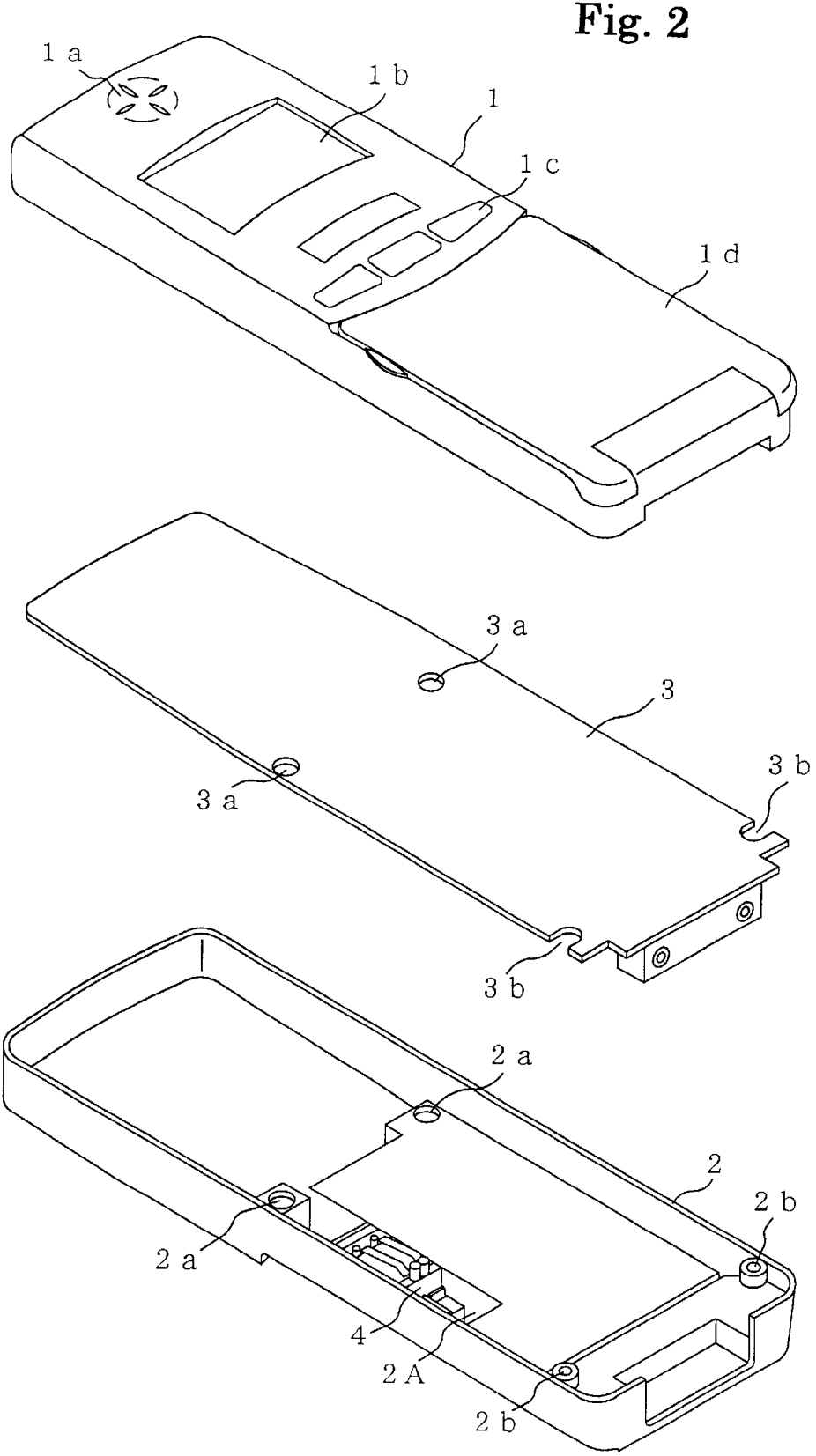
FIG. 2 is a schematic perspective view showing the structure of the mobile wireless device.

FIG. 2 is a schematic perspective figure showing the structure of the mobile wireless device. In the figure, reference numerals 1 and 2 denote cases which form the outer framework of the mobile wireless device. A speaker 1a, a display unit 1b, an operation unit 1c, a lid 1d, a screw hole (not shown) and the like are provided in the case 1. A space (space section) 2A which stores the vibrator 4, a screw hole 2a, 2b and the like are provided in the case 2. The cases 1,2 are fixed by a screw to the base plate 3. 3 is a base plate which tightly inserted between the cases 1, 2 and which is fixed and mounted on the case 2 (and the case 1). Screw holes 3a, 3b allowing screw affixation are provided in the base plate 3. 4 is a vibrator which is placed in the space 2A of the case 2.

Figure 1:
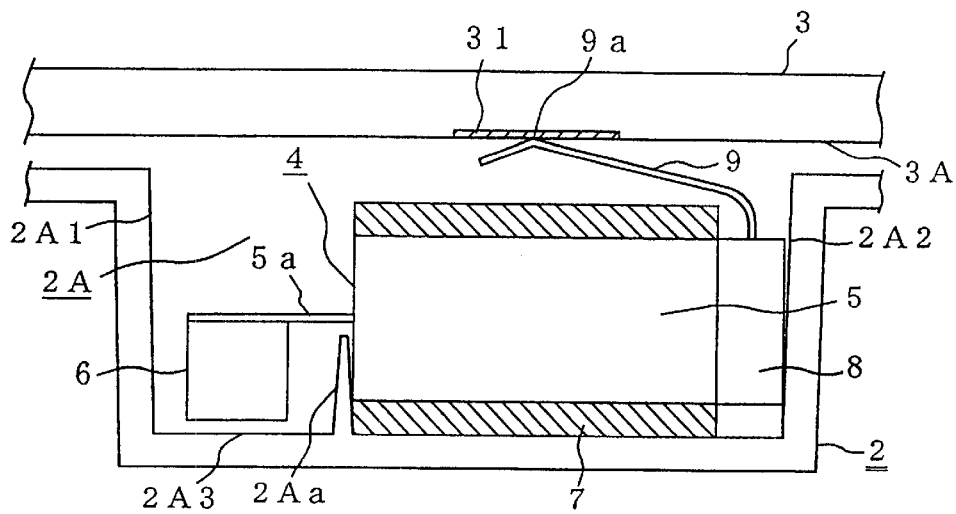
FIG. 1 is a cross section showing the structure of a conventional vibrator mounting used in a contact supply arrangement.
Figure 3:
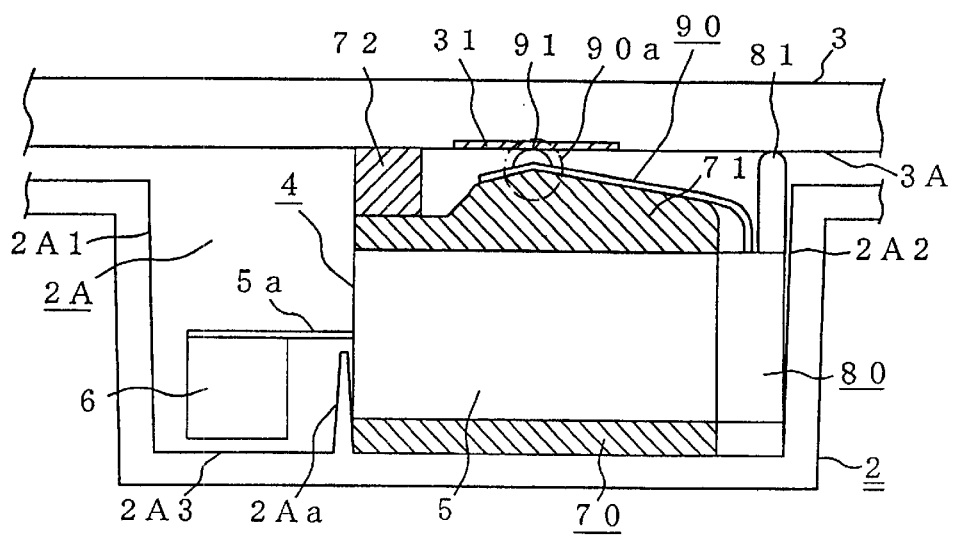
FIG. 3 is a cross section showing the structure vibrator mounting according to a first embodiment of the present invention and shows the base plate as fixed and mounted on the case.
Figure 4:
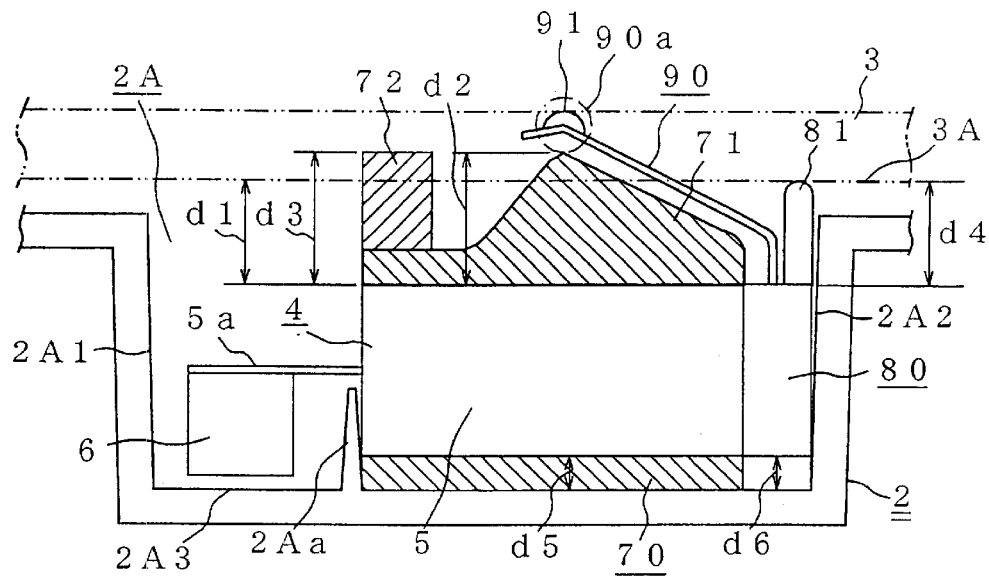
FIG. 4 is a cross section showing the structure of the vibrator mounting according to a first embodiment of the present invention and shows the base plate as fixed and mounted to the case.

FIGS. 3 and 4 are cross sections which show the structure of the vibrator mounting according to a first embodiment of the present invention. FIG. 3 shows the base plate 3 as mounted and fixed to the case 2. FIG. 4 shows the base plate 3 as not fixed to the case 2. In the figures, as explained in FIG. 2, reference numerals 1 and 2 denote a case. 3 is a base plate and 4 is a vibrator. 2A1 is a wall face on the counter balance side on the space 2A. 2A2 is a space wall face which acts as a first case wall face to which the bracket of the space 2A abuts. 2A3 is the bottom face of the space 2A. The holder pressure contact faces 2A4, 2A5 of the space 2A which act as second and third case wall faces are not shown in FIG. 1. (Refer to FIG. 5). A rib 2Aa which limits the mounting position of the vibrator 4 is provided in the space 2A. In addition the lower face 2A3 of the space 2A is formed in a U-shape in order to conform with the outer surface of the cylindrical motor main body 5. 31 is a supply terminal (land) which is provided in the base plate surface 3A of the base plate 3.

5 is a cylindrical motor main body which rotates when a signal is received. 6 is a counter weight mounted eccentrically with respect to the rotation shaft 5a which projects from one side of the motor main body 5. The counter weight rotates in response to the rotations of the rotation shaft 5a.

70 is a holder which is closely fitted to the outer surface of the motor main body 5 so as to cover the motor main body 5 and which is formed from the mounted flexible body. A mountain shaped peaked section (peaked section) 71 is formed in the flexible holder 70 in the shape of an asymmetrical inverted "V" facing the supply terminal 90. A cylindrical boss shaped projecting section 72 is provided as a mounting member which presses the base plate surface 3A against the flexible holder on the projecting side of the rotation shaft 5a.

As shown in FIG. 4, the degree of peak d2 in the mountain shaped peaked section 71 (the interval from the outer face of the motor main body 5 to the apex of the mountain shaped peaked section 72) and the degree of projection d3 of the boss shaped projecting section 72 (the interval from the outer face of the motor main body 5 to the apex of the projecting section 72) are formed so as to be greater than the depth d1 of the space (the interval from the outer radius of the motor main body 5 to the face of the base plate 3A). Furthermore the thickness d5 of the flexible holder 70 is formed so as to be of the same dimensions as gap d6 (the interval from outer face of the motor main body 5 to the lower face 2A3 of the space). The flexible holder 70 is formed from a flexible material such as silicon rubber.

80 is a bracket formed from resinous material. The bracket 80 is mounted on the other end face, opposite the end from which the rotation shaft 5a mounting the counter weight projects. A cylindrical projecting section 81 is formed opposite the base plate face 3A in the bracket 80 in order to remove the gap d4 with the base plate face 3A. The tip of the projecting section 81 of the bracket 80 (the part contacting with the base 3) is rounded.

90 is a supply terminal having a spring characteristic. One end is mounted on the bracket 80 and the other end face is bent in an asymmetrical inverted "V" shape. A spherical projection 91 is provided in the bent section 90a forming the apex of the inverted "V" shape and this projection 91 pushes against the supply land 31. In this way, since the projection 91 of the supply terminal 90 is spherical, the contact of the projection 91 and the supply land 31 becomes a contact point.

Normally metal plating is provided on the surface of the supply land 31 and the supply terminal 90 in order to improve the reliability of the contact point of the projection 91 of the supply terminal 90 and the supply land 31(in order for there to be actual conduction of electricity).

The vibrator 4 is formed from the motor main body 5, the counter weight 6, the bracket 80 and the supply terminal 90.

Figure 5:
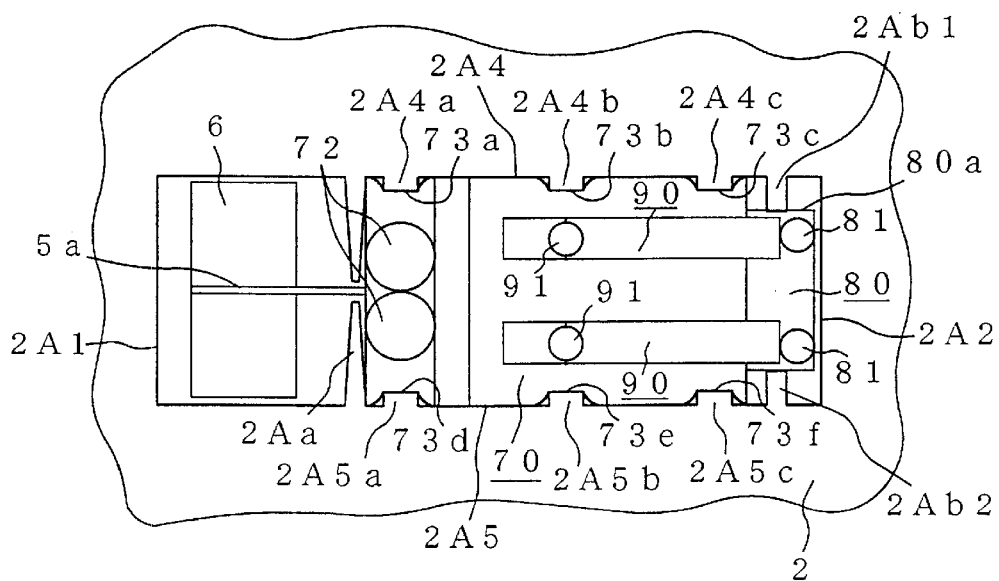
FIG. 5 is a diagram viewing the vibrator mounting shown in FIGS. 3 and 4 from above.

FIG. 5 shows the vibrator mounting shown in FIGS. 3 and 4 as seen from above (the base plate side 3). In the figure, 2Ab1, 2Ab2 storing position guides for the vibrator 4 in the form of ribs provided opposite the wall faces 2A4, 2A5 facing the bracket. The ribs are arranged so that both side faces of the bracket 80 of the vibrator 4 which are inserted into the space 2A abut.

2A4a–2A4c, 2A5a–2A5c are ribs (fixing means) which are provided on the space wall faces 2A4, 2A5 which face the flexible holder of the vibrator so as to push against the flexible holder 70 along the storing direction of the vibrator. A plurality of these ribs are provided in the rotation shaft direction of the motor main body 5.

A pair of boss shaped projections 72 of the flexible holder 70 are provided which fix the motor shaft line. A pair of supply terminals 90 is also provided. A pair of projecting sections 81 of the bracket 80 are provided in proximity to the base fixture of the supply terminal 90.

Next the operation of the invention will be explained.

(1) The operation of mounting the vibrator will be explained.

The vibrator 4 is pushed into and arranged in the space 2A while aligning its position roughly by the rib 2Aa of the space 2A and the wall face 2A2. Since insertional orientation is maintained as both side faces of the bracket 80 abut with the positional guides 2Ab1, 2Ab2, the correct orientation can be maintained even if the ribs 2A4a–2A4c, 2A5a–2A5c undergo an eroding deformation.

FIG. 4 shows this type of vibrator 4 as arranged in the space 2A. As no pressure is acting on the supply terminal 90 or the flexible holder 70, the projection 91 of the supply terminal 90 is raised above the base plate face 3A of the base plate 3 and so the apex of the boss shaped projection 72 and the mountain shaped peaked section 71 of the flexible holder 70 are raised above the base plate 3A.

Next if the base plate 3 tightly inserted between the case 1 and the case 2 is lowered with respect to the case 2, the supply land 31 of the base plate 3 and the projection 91 of the supply terminal 90 come into contact. If the base plate 3 is lowered when the projection 91 and the supply land 31 are in contact, the supply terminal 90 is lowered and comes into contact with the mountain shaped peaked section 71 of the flexible holder 70 and the base plate face 3A of the base plate 3 comes into contact with the boss shaped projection 72. (The order of contact can be varied by the size of the degree of projection d2 of the peaked section 71 and the degree of projection d3 of the boss shaped projection.) While pressuring the boss shaped projection 72 and the mountain shaped peaked section 71, the base plate is lowered into mounting position (space depth d1).

After the base plate 3 is lowered into mounting position, the case 1 and the case 2 are fixed with a screw and the position of the base plate 3 is fixed between the case 1 and the case 2. At this time, the supply terminal 90 becomes held by the base plate 3 and the mountain shaped peaked section 71. The base plate face 3A and the boss shaped projection 72 of the flexible holder 70 are pushed into contact. The base plate face 3A abuts with the projection 81 of the bracket 80. The thickness d5 of the part which contacts with the bottom face of the space 2A of the flexible holder 70 is compressed.

FIG. 3 shows the base plate 3 as sandwiched by the case 1 and the case 2. In the vibrator 4, the side from which the rotation shaft, on which the counter weight 5 is eccentrically mounted, projects is pushed by the base plate face through the projection provided in the flexible holder 4 and both side faces of the vibrator 4 are tightly held by the ribs 2A4a–2A4c, 2A5a–2A5c.

In FIG. 3, there is a space between the case 2 and the base plate 3. This is due to the fact that the screw holes 2a–2d are formed on the step of the case 2 and has no particular effect on the present invention.

(2) Next the operation of signal reception by the vibrator 4 will be explained.

When the mobile wireless device receives a signal, electrical force is supplied to the motor main body 5 through the supply land 31 and the supply terminal 90. The rotation shaft 5a of the motor main body 5 rotates with a certain angular speed. A counter weight 6 mounted eccentrically with respect to the rotation shaft 5a of the motor main body 5 rotates and generates a centrifugal force. This centrifugal force vibrates the vibrator 4, the vibrations are transmitted to the case 1, 2 and the reception of a signal is reported.

In such a way, according to embodiment 1 of the present invention, the positional determination of the vibrator 4 in the direction of the motor shaft line is accurately performed by the rib 2A and the space wall face 2A2 which abuts the bracket. Accurate positional determination in the vertical direction is performed by the projection 72, which is provided on the side from which the rotation shaft of the flexible holder 70 projects, being pushed by the base plate face 3A. Both side faces of the flexible holder 70 are tightly held by the ribs 2A4a–2A4c, 2A5a–2A5c of the space wall faces 2A4, 2A5 and positional determination in the horizontal direction is performed.

What is claimed is:

1. A vibrator mounting in an electrical device case which fixes and stores a vibrator having, on one end, a bracket which mounts a supply terminal extending towards the upper section of a motor main body and, on another end, a counter weight which is mounted eccentrically with respect to a rotation shaft on the end which extends the motor rotation shaft wherein said vibrator mounting is provided with a case which has a rib which is disposed on the other end of the motor main body, which holds the motor main body with a first case wall face and determines the position in the axial direction, second and third case wall faces which face both side faces of the motor main body, and a bottom face which mounts the motor main body, and a peaked section which is provided to tightly hold the contact point provided in the supply terminal part between a base plate, which is disposed on the upper part of the motor main body and which is provided with a supply terminal which supplies electricity by contacting with the contact point provided on the supply terminal part, and the supply terminal in a flexible holder mounted on the outer peripheral face of the motor main body, so as to prevent relative motion between said contact point and said supply terminal.

2. A vibrator mounting according to claim 1 wherein the degree of projection of the peaked section is higher than the mounting position of the base plate.

3. A vibrator mounting according to claim 1 wherein the contact point of the terminal for electricity supply with the supply terminal is of a spherical shape.

4. A vibrator mounting according to claim 1 wherein the contact point of the terminal for electricity supply with the supply terminal is of a spherical shape.

5. A vibrator mounting provided with a vibrator which mounts a counter weight eccentrically with respect to the rotation shaft which projects from one end face of the motor, which is provided with a bracket mounting a supply terminal having a spring characteristic on the other end of the motor, said vibrator mounting and closely pressing a flexible holder on the outer face of the motor, a case forming a space which stores the vibrator between the base plate, and which forms a rib which fixes a motor end face from which projects the rotation shaft into the space, a supply land provided on the base plate face so as to push against the supply terminal, a projection formed so as to be pressured on the side from which the rotation shaft of the flexible holder projects by the base plate, and a peaked section which is formed in a flexible holder so as to tightly hold the supply terminal against the land which supplies electricity so as to prevent relative motion between said supply land and said supply terminal.

6. A vibrator mounting in an electrical device case which fixes and stores a vibrator having, on one end, a bracket which mounts a supply terminal extending towards the upper section of a motor main body and, on another end, a counter weight which is mounted eccentrically with respect to a rotation shaft on the end which extends the motor rotation shaft wherein said vibrator mounting is provided with a case which has a rib which is disposed on the other end of the motor main body and which holds the motor main body with a first case wall face and determines the position in the axial direction, second and third case wall faces which face both side faces of the motor main body, and a bottom face which mounts the motor main body, a base plate fixed to the upper part of the motor main body and which is provided with a supply terminal which supplies electricity by contacting with the contact point provided on the supply terminal part and a peaked section provided so as to tightly hold the contact point provided in the supply terminal part between the mounting member, which is disposed between the base plate and the motor main body and which pushes the other end of the motor main body in the direction of the lower face of the case, and the terminal which supplies electricity in a flexible holder mounted on the outer face of the motor main body so as to prevent relative motion between said contact point and said supply terminal.

7. A vibrator mounting according to claim 6 wherein the contact point of the terminal for electricity supply with the supply terminal is of a spherical shape.

8. A mounting structure for a vibrator motor contained in an electronic device, said vibrator motor including a rotation shaft and a counterweight eccentrically mounted on said shaft, and having an electrical power supply terminal connected thereto, said structure comprising:

a motor holder for containing said motor;

a case for housing said motor holder containing said motor;

a base plate including an electrical power supply terminal contact for making contact with said electrical power supply terminal at a contact point of said electrical power supply terminal when secured to said case;

a mounting member disposed between said base plate and said motor holder, such that when said base plate is secured to said case, said mounting member presses said motor holder against said case in such manner as to prevent relative motion between said vibrator motor and said case; and wherein said motor includes a bracket at an end thereof opposite said rotation shaft, said electrical power supply terminal being connected to said bracket, and said mounting member is disposed at the rotation shaft end of the motor, further comprising a second mounting member disposed between said bracket and said base plate for pressing said bracket against said case when said base plate is secured to said case.

9. A vibrator mounting according to claim 8 wherein the contact point of the terminal for electricity supply with the supply terminal is of a spherical shape.

10. A vibrator mounting according to claim 8 wherein a fixation means which tightly holds both sides of the motor main body is provided on case wall faces which face both side faces of the motor main body.

11. A vibrator mounting according to claim 10 wherein the fixation means is a rib provided along the direction of storing the vibrator on said case wall faces which face both side faces of the motor main body.

12. A vibrator mounting according to claim 11 wherein the contact point of the terminal for electricity supply with the supply terminal is of a spherical shape.

13. A vibrator mounting according to claim 10 wherein the contact point of the terminal for electricity supply with the supply terminal is of a spherical shape.

14. A vibrator mounting in an electrical device case which fixes and stores a vibrator having, on one end, a bracket which mounts a supply terminal extending towards the upper section of a motor main body and, on another end, a counter weight which is mounted eccentrically with respect to a rotation shaft on the end which extends the motor rotation shaft wherein said vibrator mounting is provided with a case which has a rib which is disposed on the other side of the motor main body, which holds the motor main body with a first case wall face and determines the position in the axial direction, second and third case wall faces which face both side faces of the motor main body, and a bottom lower face which mounts the motor main body, a base plate fixed to the upper section of the motor main body and which is provided with a supply terminal which supplies electricity by contacting with the contact point provided on the supply terminal part and a peaked section provided so as to tightly hold the contact point provided in the supply terminal part between the mounting member which is disposed between the base plate and the motor main body and which pushes the other end of the motor main body in the direction of the lower face of the case and the terminal which supplies electricity in a flexible holder mounted on the outer face of the motor main body so as to prevent relative motion between said contact point and said supply terminal.

* * * * *

UNITED STATES PATENT AND TRADEMARK OFFICE
CERTIFICATE OF CORRECTION

PATENT NO.    : 6,388,349 B1
DATED         : May 14, 2002
INVENTOR(S)   : Seiji Ioka et al.

It is certified that error appears in the above-identified patent and that said Letters Patent is hereby corrected as shown below:

Column 4,
Line 27, delete the word "In".

Signed and Sealed this

Eighteenth Day of March, 2003

JAMES E. ROGAN
*Director of the United States Patent and Trademark Office*